(12) United States Patent
Zhu et al.

(10) Patent No.: US 9,313,747 B2
(45) Date of Patent: Apr. 12, 2016

(54) STRUCTURED CODEBOOK FOR UNIFORM CIRCULAR ARRAY (UCA)

(75) Inventors: Yuan Zhu, Beijing (CN); Qinghua Li, San Ramon, CA (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/993,629

(22) PCT Filed: Nov. 30, 2011

(86) PCT No.: PCT/US2011/062742
§ 371 (c)(1),
(2), (4) Date: Sep. 3, 2013

(87) PCT Pub. No.: WO2013/006194
PCT Pub. Date: Jan. 10, 2013

(65) Prior Publication Data
US 2013/0336152 A1    Dec. 19, 2013

Related U.S. Application Data

(60) Provisional application No. 61/504,054, filed on Jul. 1, 2011.

(51) Int. Cl.
*H04W 52/24* (2009.01)
*H04B 7/06* (2006.01)
(Continued)

(52) U.S. Cl.
CPC ............ *H04W 52/242* (2013.01); *H04B 7/0697* (2013.01); *H04B 15/00* (2013.01);
(Continued)

(58) Field of Classification Search
CPC ...... H04W 24/00; H04W 84/12; H04W 80/04; H04W 88/06; H04W 74/08; H04W 52/40; H04L 43/50; H04L 43/0852; H04L 43/08; H04L 1/0001; H04J 3/16; H04J 3/1682; H04J 3/1694; H04J 9/00
See application file for complete search history.

(56) References Cited

U.S. PATENT DOCUMENTS 7,933,560 B2 *  4/2011  Han ................ H04B 7/0626
370/232
8,315,204 B2 * 11/2012  Zhu ................. H04L 12/66
370/342

(Continued)

FOREIGN PATENT DOCUMENTS

CN      101944981 A      1/2011
CN      102045762 A      5/2011

OTHER PUBLICATIONS

International Search Report and Written Opinion mailed Jun. 28, 2012 from International Application No. PCT/US2011/062742.

(Continued)

*Primary Examiner* — Warner Wong
(74) *Attorney, Agent, or Firm* — Schwabe, Williamson & Wyatt, P.C.

(57) ABSTRACT

Embodiments of the present disclosure describe method, apparatus, and system configurations that implement or otherwise use a codebook designed for antennas configured in a circular array. A method includes receiving, by user equipment (UE) from an enhanced node B (eNB) station of a wireless communication network, a Channel State Information Reference Signal (CSI-RS) for the UE to perform channel measurements of multiple antennas of the eNB station, wherein the multiple antennas are configured in one or more circular arrays, performing, by the UE, channel measurements of the multiple antennas of the eNB station using the received CSI-RS, and determining, by the UE, a code word based on the channel measurements, the code word being stored in a codebook designed for a circular antenna array. Other embodiments may be described and/or claimed.

5 Claims, 6 Drawing Sheets

(51) Int. Cl.

| | |
|---|---|
| *H04L 1/00* | (2006.01) |
| *H04L 1/06* | (2006.01) |
| *H04W 72/04* | (2009.01) |
| *H04B 15/00* | (2006.01) |
| *H04W 8/02* | (2009.01) |
| *H04W 24/00* | (2009.01) |
| *H04W 52/02* | (2009.01) |
| *H04L 5/00* | (2006.01) |
| *H04L 27/34* | (2006.01) |
| *H04L 5/14* | (2006.01) |
| *H04W 4/00* | (2009.01) |
| *H04W 72/02* | (2009.01) |
| *H04W 76/02* | (2009.01) |
| *H04W 52/14* | (2009.01) |
| *H04W 72/12* | (2009.01) |
| *H04W 24/08* | (2009.01) |
| *H04L 27/36* | (2006.01) |
| *H04W 52/32* | (2009.01) |
| *H04W 84/04* | (2009.01) |

(52) U.S. Cl.
CPC ........... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/244* (2013.01); *H04W 72/02* (2013.01); *H04W 72/04* (2013.01); *H04W 72/042* (2013.01); *H04W 72/1215* (2013.01); *H04W 76/028* (2013.01); *H04L 1/0025* (2013.01); *H04L 27/362* (2013.01); *H04W 52/325* (2013.01); *H04W 84/042* (2013.01)

(56) References Cited

U.S. PATENT DOCUMENTS

| | | | | |
|---|---|---|---|---|
| 2006/0155533 A1* | 7/2006 | Lin | ...................... | H04B 7/0617 704/223 |
| 2006/0279460 A1* | 12/2006 | Yun | ...................... | H01Q 3/2605 342/377 |
| 2008/0013644 A1* | 1/2008 | Hugl et al. | ..................... | 375/295 |
| 2008/0080449 A1* | 4/2008 | Huang | ................. | H04B 7/0634 370/342 |
| 2009/0041150 A1* | 2/2009 | Tsai et al. | ...................... | 375/267 |
| 2009/0086842 A1* | 4/2009 | Shi | ........................ | H04B 7/0452 375/267 |
| 2009/0129501 A1* | 5/2009 | Mehta et al. | ................... | 375/299 |
| 2010/0054196 A1* | 3/2010 | Hui | ............................... | 370/329 |
| 2010/0054200 A1* | 3/2010 | Tsai | .............................. | 375/260 |
| 2010/0322176 A1* | 12/2010 | Chen et al. | ..................... | 370/329 |
| 2011/0075746 A1* | 3/2011 | Rheinschmitt et al. | ........ | 375/260 |
| 2011/0122968 A1* | 5/2011 | Jongren | ............... | H04B 7/0639 375/296 |
| 2011/0128939 A1* | 6/2011 | Lim et al. | ....................... | 370/335 |
| 2011/0135020 A1* | 6/2011 | Au-Yeung et al. | ............. | 375/260 |
| 2011/0243207 A1* | 10/2011 | Tang | .................... | H04B 7/0626 375/224 |
| 2011/0261897 A1* | 10/2011 | Jen | ....................... | H04B 7/0639 375/285 |
| 2012/0027125 A1* | 2/2012 | Zhou | ............................. | 375/297 |
| 2012/0069887 A1* | 3/2012 | Park et al. | ...................... | 375/224 |
| 2012/0281783 A1* | 11/2012 | Cheng et al. | ................... | 375/295 |
| 2012/0328039 A1* | 12/2012 | Mazzarese | ............. | H04B 7/063 375/267 |

OTHER PUBLICATIONS

3GPP, "Discussion on CSI feedback enhancement for DL MIMO," 3GPP TSG RAN WG1 Meeting #65, R1-111470, May 9-13, 2011, Spain, Barcelona, 7 pages.

3GPP, "Real-Life Scenarios for Downlink MIMO Enhancment," 3GPP TSG-RAN WG1 #65, R1-111434, May 9-13, 2011, Barcelona, Spain, 4 pages.

3GPP, "Discussion of DL-MIMO Enhancement for Release 11," 3GPP TSG RAN1 #65, R1-111603, May 9-13, 2011, Barcelona, Spain, 2 pages.

International Preliminary Report on Patentability for PCT Application No. PCT/US2011/062742, dated Jan. 16, 2014, 7 pages.

3GPP TS 36.11 V10.2.0, 3rd Generation Partnership Project; Technical Specification Group Radio Access Network; Evolved Universal Terrestrial Radio Access (E-UTRA); Physical Channels and Modulation (Release 10); Jun. 2011, 103 pages.

3GPP TR 25.996 V10.0.0, 3rd Generation Partnership Project; Technical Specification Group Radio Access Network; Spatial channel model for Multiple Input Multiple Output (MIMO) simulations (Release 10), Mar. 2011, 40 pages.

* cited by examiner

STRUCTURED CODEBOOK FOR UNIFORM CIRCULAR ARRAY (UCA)

CROSS REFERENCE TO RELATED APPLICATIONS

The present application is a national phase entry under 35 U.S.C. §371 of International Application No. PCT/US2011/062742, filed Nov. 30, 2011, entitled "STRUCTURED CODEBOOK FOR UNIFORM CIRCULAR ARRAY (UCA)", which designates the United States of America, and which claims priority to U.S. Provisional Patent Application No. 61/504,054, filed Jul. 1, 2011, the entire contents and disclosures of which are hereby incorporated by reference in their entireties.

FIELD

Embodiments of the present disclosure generally relate to the field of wireless communication systems, and more particularly, to the use of a codebook designed for antennas configured in a circular array.

BACKGROUND

Mobile networks that facilitate transfer of information at broadband rates continue to be developed and deployed. Such networks may be colloquially referred to herein as broadband wireless access (BWA) networks. A variety of different device types may be used in broadband wireless technologies. Such devices may include, for example, personal computers, handheld devices, and other consumer electronics such as music players, digital cameras, etc., that are configured to communicate over the wireless broadband networks.

Some communication systems, such as, for example, closed loop multiple-input-multiple-output (MIMO) systems may utilize codebooks designed for base stations having linear arrays of antennas (e.g., up to eight antennas per base station) to facilitate link establishment procedures. New codebook designs and schemes may be needed for emerging antenna configurations that are non-linear and/or include larger numbers of antennas.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide method, apparatus, and system configurations that implement or otherwise use a codebook designed for antennas configured in a circular array. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to broadband wireless access (BWA) networks including networks operating in conformance with one or more protocols specified by the 3$^{rd}$ Generation Partnership Project (3GPP) and its derivatives, the WiMAX Forum, the Institute for Electrical and Electronic Engineers (IEEE) 802.16 standards (e.g., IEEE 802.16-2005 Amendment), long-term evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, enhanced node Bs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

According to various embodiments, the present disclosure describes a method including receiving, by user equipment (UE) from an enhanced node B (eNB) station of a wireless communication network, a Channel State Information Reference Signal (CSI-RS) for the UE to perform channel measurements of multiple antennas of the eNB station, wherein the multiple antennas are configured in one or more circular arrays, performing, by the UE, channel measurements of the multiple antennas of the eNB station using the received CSI-RS, and determining, by the UE, a code word based on the channel measurements, the code word being stored in a codebook designed for a circular antenna array.

In some embodiments, the method may include sending, by the UE to the eNB station, a value that indicates the code word, the code word to facilitate beamforming between the eNB station and the UE.

In some embodiments, the codebook is a first codebook stored at the UE, and sending, by the UE, the value includes sending an index of the code word for the eNB station to identify the code word in a second codebook stored at the eNB station.

In some embodiments, determining, by the UE, the code word includes selecting a code word that maximizes or minimizes a metric that is calculated using the channel measurements.

In some embodiments, receiving, by the UE, the CSI-RS includes receiving the CSI-RS for the UE to perform channel measurements for twelve antennas of the eNB station.

In some embodiments, the individual antennas include twelve antennas that are configured in a single circular array. In some embodiments, the individual antennas include twelve antennas that are configured in three circular arrays.

In some embodiments, the code word, W, is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook.

According to various embodiments, an apparatus includes an antenna, a processor configured to communicate with an enhanced node B (eNB) station of wireless communication network via the antenna, and a storage medium coupled to the processor, the storage medium having instructions stored thereon, that if executed by the processor, result in receiving, from the eNB station, a Channel State Information Reference Signal (CSI-RS) for the apparatus to perform channel measurements of twelve antennas of the eNB station, wherein the twelve antennas are configured in one or more circular arrays, determining a code word based on channel measurements performed by the apparatus using the CSI-RS, the code word being stored in a codebook designed for a circular antenna array, and sending, to the eNB station, a value that indicates the code word, the code word to facilitate beamforming between the eNB station and the apparatus.

In some embodiments, the instructions, if executed, further result in performing the channel measurements of the twelve antennas of the eNB station using the received CSI-RS. Determining the code word may include selecting a code word that maximizes or minimizes a metric that is calculated at the apparatus using the channel measurements.

In some embodiments, the codebook is a first codebook stored at the apparatus and sending, to the eNB station, the value includes sending an index of the code word for the eNB station to identify the code word in a second codebook stored at the eNB station. In some embodiments, receiving, from the eNB station, the CSI-RS includes receiving the CSI-RS for the apparatus to perform channel measurements for twelve antennas of the eNB station.

In some embodiments, the twelve antennas are configured in a single circular array. In some embodiments, the twelve antennas are configured in three circular arrays.

In some embodiments, the code word, W, is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook.

According to various embodiments, another method includes configuring, by a base station of a wireless communication network, a user equipment (UE) with a Channel State Information Reference Signal (CSI-RS) for performing channel measurements of twelve antennas of the base station, wherein the twelve antennas are configured in one or more circular arrays, and receiving, by the base station from the UE, a value that indicates a code word of a codebook designed for a circular antenna array, the code word being used by the base station to facilitate beamforming between the base station and the UE, the code word being based on the channel measurements performed by the UE using the configured CSI-RS.

In some embodiments, the method includes using, by the base station, the code word to facilitate beamforming between the base station and the UE. In some embodiments configuring, by the base station, the UE with CSI-RS includes configuring the UE with a twelve antenna port CSI-RS pattern for the twelve antennas of the base station.

In some embodiments, the twelve antennas are configured in a single circular arrangement. In some embodiments, the twelve antennas are configured in three circular arrangements.

In some embodiments, the code word, W, is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook.

In some embodiments, the codebook for the circular antenna array is designed at least in part by, selecting a codebook size, L, calculating L/2 number of code words of a first group using the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < \frac{L}{2}$$

and calculating L/2 number of code words of a second group, the code words of the second group being orthogonal to the first group of code words.

In some embodiments, the base station is an enhanced node B (eNB) base station of an Internet Protocol (IP) based network and the UE is a mobile device.

According to various embodiments, a system includes a processor configured to communicate with user equipment (UE) via an enhanced node B (eNB) station of a wireless communication network, and a storage medium coupled to the processor, the storage medium having instructions stored thereon, that if executed by the processor, result in configuring the UE with a Channel State Information Reference Signal (CSI-RS) for performing channel measurements of multiple antennas of the eNB station, wherein the multiple antennas are configured in one or more uniform circular arrays, receiving, from the UE, a value that indicates a code word of a codebook designed for a circular antenna array, the code word being based on the channel measurements performed by the UE using the configured CSI-RS, and establishing a link between the eNB station and the UE using the code word to facilitate beamforming between the eNB station and the UE.

In some embodiments, configuring the UE with the CSI-RS includes sending to the UE the CSI-RS for twelve antennas of the eNB station. In some embodiments, the twelve antennas are configured in a single roughly circular array. In some embodiments, the twelve antennas are configured in three roughly circular arrays.

In some embodiments, the code word, W, is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook.

In some embodiments, the wireless communication network is an Internet Protocol (IP) based network.

Figure 1:
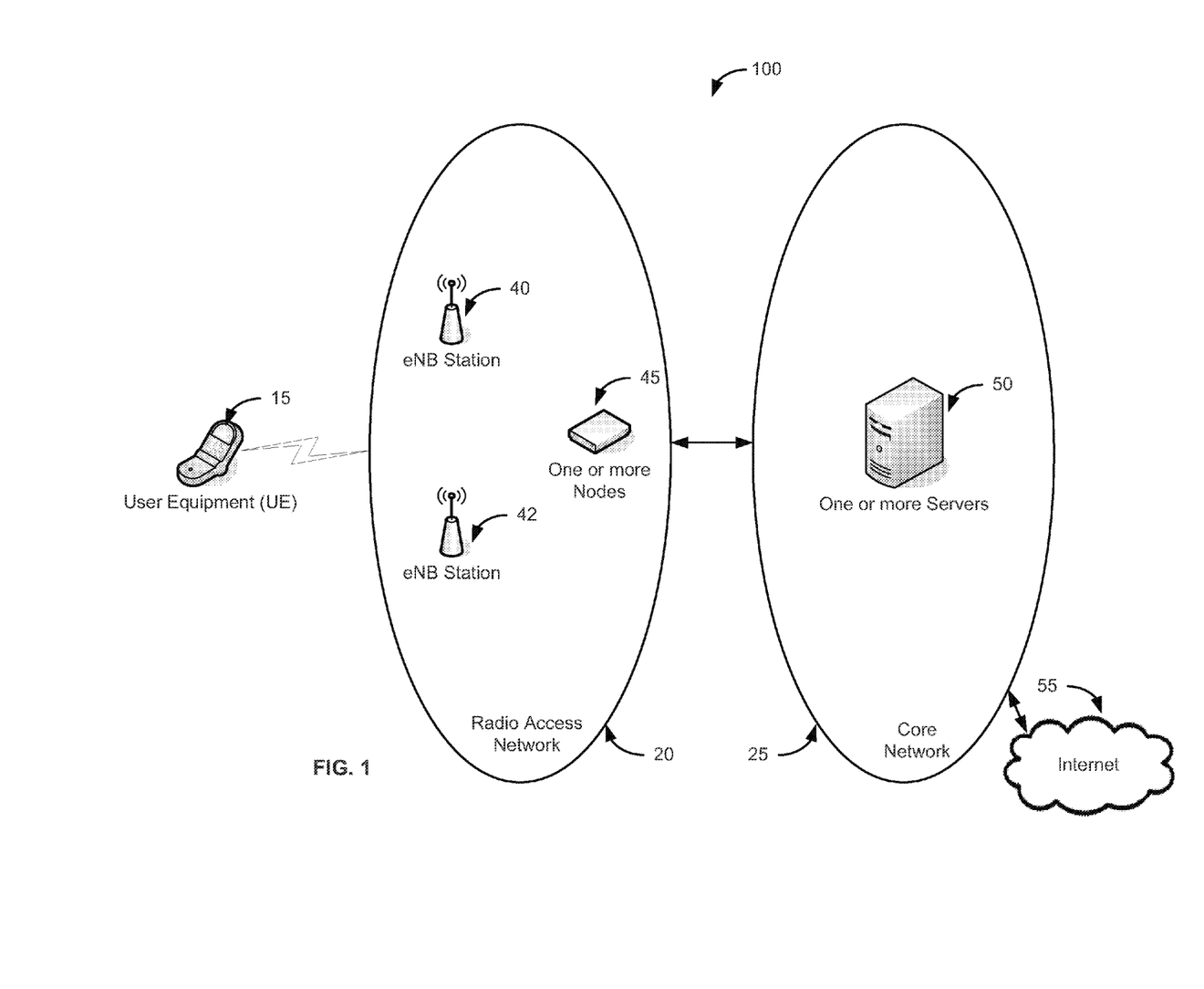
FIG. 1 schematically illustrates an example broadband wireless access (BWA) network in accordance with some embodiments.

FIG. 1 schematically illustrates an example broadband wireless access (BWA) network 100 in accordance with some embodiments. The BWA network 100 may include one or more radio access networks (RAN) 20 and a core network 25.

User Equipment (UE) 15 may access the core network 25 via a radio link ("link") with a base station (BS) such as, for example, one of eNB stations 40, 42, etc., in the RAN 20. The UE 15 may, for example, be a subscriber station that is configured to communicate with the eNB stations 40, 42 using a multiple-input and multiple-output (MIMO) communication scheme such as a closed-loop MIMO scheme with codebook. For example, a value (e.g., a code word) of the code book may be used to facilitate link establishment (e.g., beamforming) between one of the eNB stations 40, 42 and the UE 15. One or more antennas of the UE 15 may be used to concurrently utilize radio resources of multiple respective component carriers (e.g., which may correspond with antennas of eNB stations 40, 42) of the BWA network 100. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments. While FIG. 1 generally depicts the UE 15 as a cellular phone, in various embodiments the UE 15 may be a personal computer (PC), a notebook, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like.

The eNB stations 40, 42 may include multiple antennas, one or more radio modules to modulate and/or demodulate signals transmitted or received on an air interface, and one or more digital modules to process signals transmitted and received on the air interface. The eNB stations 40, 42 may each be configured to provide radio resources across multiple carriers via the multiple antennas to the UE 15. In some embodiments, one or more of the eNB stations 40, 42 include antennas configured in a circular array and are configured to perform link establishment procedures using a codebook designed for antennas configured in a circular array. In other embodiments, other types of base stations that use multiple antennas to communicate with the UE 15 may be used.

In some embodiments, communication with the UE 15 via RAN 20 may be facilitated via one or more nodes 45. The one or more nodes 45 may act as an interface between the core network 25 and the RAN 20. According to various embodiments, the one or more nodes 45 may include a Mobile Management Entity (MME) that is configured to manage signaling exchanges (e.g., authentication of the UE 15)

between the eNB stations 40, 42 and the core network 25 (e.g., one or more servers 50), a Packet Data Network Gateway (PDN-GW) to provide a gateway router to the Internet 55, and/or a Serving Gateway (S-GW) to manage user data tunnels between the eNB stations 40, 42 of the RAN 20 and the PDN-GW. Other types of nodes may be used in other embodiments.

The core network 25 may include logic (e.g., a module) to provide authentication of the UE 15 or other actions associated with establishment of a communication link to provide a connected state of the UE 15 with the BWA network 100. For example, the core network 25 may include one or more servers 50 that may be communicatively coupled to the eNB stations 40, 42. In an embodiment, the one or more servers 50 include a Home Subscriber Server (HSS), which may be used to manage user parameters such as a user's International Mobile Subscriber Identity (IMSI), authentication information, and the like. The one or more servers 50 may include over-the-air (OTA) servers in some embodiments. In some embodiments, logic associated with different functionalities of the one or more servers 50 may be combined to reduce a number of servers, including, for example, being combined in a single machine or module.

According to various embodiments, the BWA network 100 is an Internet Protocol (IP) based network. For example, the core network 25 may be an IP based network. Interfaces between network nodes (e.g., the one or more nodes 45) may be based on IP, including a backhaul connection to the eNB stations 40, 42.

Figure 2:
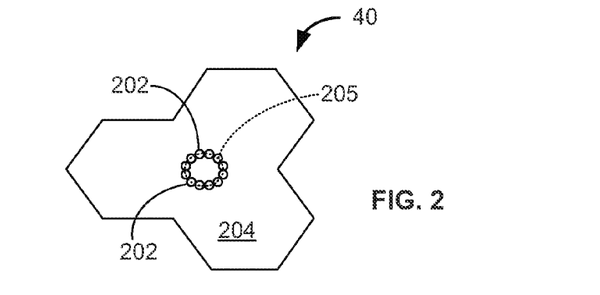
FIG. 2 schematically illustrates an example enhanced node-B (eNB) station, in accordance with some embodiments.

FIG. 2 schematically illustrates an example eNB station 40, in accordance with some embodiments. The eNB station 40 may include a plurality of antennas 202 (e.g., Tx antennas) configured in a circular array 205 (e.g., a circle), as can be seen. Configuring antennas 202 in a circular array (e.g., the circular array 205) may provide an eNB station 40 that is better suited for omni-directional communication than an eNB station that has antennas configured in a linear array or an array composed of linear array segments. In some embodiments, the circular array 205 is a uniform circular array (UCA) such that each antenna of the antennas 202 is separated from adjacent/neighboring antenna of the antennas 202 by a same radial distance. In the depicted embodiment, the antennas 202 include twelve antennas. More or fewer antennas than depicted may be used in other embodiments.

In the embodiment of FIG. 2, the antennas 202 of the circular array 205 may be configured at a single site to service a single sector 204. The configuration of FIG. 2 may provide less inter-cell interference compared with a configuration that uses linear arrays to service a similar area.

Figure 3:
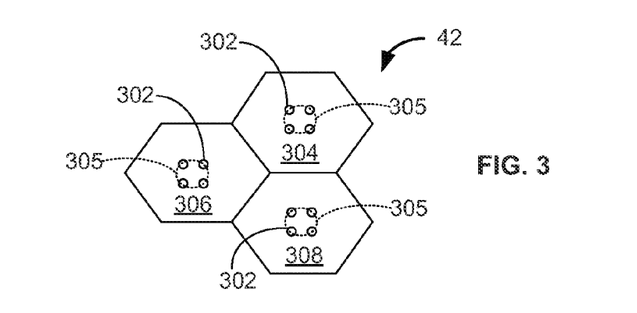
FIG. 3 schematically illustrates another example eNB station, in accordance with some embodiments.

FIG. 3 schematically illustrates another example eNB station 42, in accordance with some embodiments. The eNB station 42 may include a plurality of antennas 302 configured in a plurality of circular arrays 305. In the depicted embodiment, the plurality of circular arrays 305 includes three circular arrays (e.g., UCAs), each of which include four antennas (e.g., of the plurality of antennas 305) to provide a total of twelve antennas. More or fewer antennas can be used in other embodiments. The configuration of FIG. 3 provides a circular array at three sites to serve a corresponding first sector 304 (e.g., cell 1), a second sector 306 (e.g., cell 2), and a third sector 308 (e.g., cell 3). That is, the configuration of FIG. 3 requires more locations/sites relative to the configuration of FIG. 2 and may be less suitable for an operator of a wireless communication network (e.g., the BWA network 100 of FIG. 1) that is location-limited than the configuration of FIG. 1. Embodiments of the eNB stations 40 and 42 described for respective FIGS. 2 and 3 may be combined in some embodiments. Other suitable circular antenna configurations can be used for other eNB stations in other embodiments.

Figure 4:
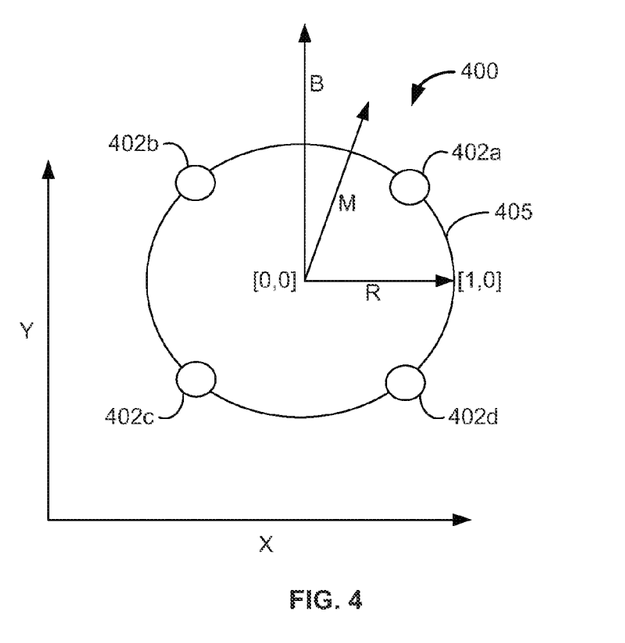
FIG. 4 schematically illustrates a spatial channeling model for a circular array of antennas, in accordance with some embodiments.

FIG. 4 schematically illustrates a spatial coordinate 400 for a circular array 405 of antennas 402a, 402b, 402c, 402d, in accordance with some embodiments. The spatial coordinate 400 can be used to describe UCA configurations of the antennas 402a, 402b, 402c, 402d using, for example, a two-dimensional axis (e.g., coordinates [X,Y]). For example, the circular array 405 may have a radius, R, which is depicted as extending from coordinate [0,0] to coordinate [1,0]. Similar coordinates may be calculated to describe a position for individual antennas of the antennas 402a, 402b, 402c, 402d. Relative positions of each antenna relative to a reference antenna of the antennas 402a, 402b, 402c, 402d may be calculated. For example, antenna 402a may be selected as a reference antenna. Assuming an antenna broadside, B, which can be any angle, a unit vector, M, representing one or more channel subpaths may be calculated. Phase contribution for the one or more channel subpaths may also be calculated.

In one embodiment, calculations for a spatial channeling model between a UCA to a UE may be mathematically represented by the following equations. For example, a circular array for a base station (e.g., eNB station 40 or 42 of FIG. 1) may have an S-element (e.g., antenna) array and a mobile station (MS) (e.g., UE 15 of FIG. 1) may have a U-element (e.g., antenna) array, where S and U represent a total number of the respective elements. Channel coefficients for one of N multipath components may be given by a U-by-S matrix of values. For example, for an $n^{th}$ multipath component where $n=1, \ldots, N$, an $s^{th}$ component where $s=1, \ldots, S$, and a $u^{th}$ component where $u=1, \ldots, U$, a channel matrix, h, may be given by Equation (1) as follows:

$$h_{u,s,n}(t) = \sqrt{\frac{P_n \sigma_{SF}}{M}} \sum_{m=1}^{M} \left( \begin{bmatrix} \chi_{s,BS}^{(v)}(k_{m,n}^{BS}) \\ \chi_{s,BS}^{(h)}(k_{m,n}^{BS}) \end{bmatrix} \begin{bmatrix} e^{j\Phi_{m,n}^{(v,v)}} & \sqrt{r_{n1}} e^{j\Phi_{m,n}^{(v,h)}} \\ \sqrt{r_{n2}} e^{j\Phi_{m,n}^{(h,v)}} & e^{j\Phi_{m,n}^{(h,h)}} \end{bmatrix} \begin{bmatrix} \chi_{u,MS}^{(v)}(k_{m,n}^{MS}) \\ \chi_{u,MS}^{(h)}(k_{m,n}^{MS}) \end{bmatrix} \times \\ e^{jk_{m,n}^{BS} \cdot r_s^{BS}} \times e^{jk_{m,n}^{MS} \cdot r_u^{MS}} \times e^{jk_{m,n}^{MS} \cdot v \cdot t} \right)$$

Equation (1)

In Equation (1), t is time, $P_n$ is power of $n^{th}$ path, $\sigma_{SF}$ is lognormal shadow fading, which may be a bulk parameter to the n paths for a given drop, M is a number of subpaths per path (m=1, ..., M), $\chi_{s,BS}^{(v)}$ is a BS antenna complex response for a vertical polarization (V-pol) component, $\chi_{s,BS}^{(h)}$ is a BS antenna complex response for a horizontal polarization (H-pol) component, $\chi_{u,MS}^{(v)}$ is a MS antenna complex response for a V-pol component, $\chi_{u,MS}^{(h)}$ is a MS antenna complex response for an H-pol component, $$k = \frac{2\pi}{\lambda} \begin{bmatrix} \cos(\theta) \\ \sin(\theta) \end{bmatrix},$$

where λ is a carrier wavelength and θ is an angle of one channel subpath in the coordinate system in which each antenna array element is located. For example, $k_{m,n}^{BS}$ represents a unit vector of the $n^{th}$ subpath of the $m^{th}$ path of a departure channel of the BS in the coordinate system and $k_{m,n}^{MS}$ is a unit vector of the $n^{th}$ subpath of the $m^{th}$ path of the arrival channel of the MS. In Equation (1), j is the square root of −1, $\Phi_{m,n}^{(v,v)}$ is the phase of the $m^{th}$ subpath of the $n^{th}$ path between the vertical component of the BS element and the vertical component of the MS element, $\Phi_{m,n}^{(v,h)}$ is the phase between the vertical component of the BS element and the horizontal component of the MS element, $\Phi_{m,n}^{(h,v)}$ is the phase between the horizontal component of the BS element and the vertical component of the MS element, $\Phi_{m,n}^{(h,h)}$ is the phase between the horizontal component of the BS element and the horizontal component of the MS element, $r_{n1}$ is a random variable representing a power ratio of waves of the $n^{th}$ path leaving the BS in the vertical direction and arriving at the MS in the horizontal direction (v-h) to those leaving in the vertical direction and arriving in the vertical direction (v-v), $r_{n2}$ is a random variable representing a power ratio of waves of the $n^{th}$ path leaving the BS in the horizontal direction and arriving at the MS in the vertical direction to those leaving in the vertical direction and arriving in the vertical direction (v-v), $r_s^{BS}$ is a vector denoting a position of antenna element s relative to the reference antenna for the BS, $r_u^{MS}$ is a vector denoting a position of antenna element u relative to a reference antenna for the MS, and V is a speed vector representing a moving speed and direction of the MS.

An absolute antenna position vector, $\hat{r}_s^{BS}$, can be calculated as follows using Equation (2) for antennas (e.g., antennas 402a, 402b, 402c, 402d) configured in a circular array (e.g., UCA array), where R is the radius of the circular array (e.g., circular array 405):

$$\hat{r}_s^{BS} = R \begin{bmatrix} \cos\left(\frac{2\pi s}{S}\right) \\ \sin\left(\frac{2\pi s}{S}\right) \end{bmatrix}, 0 \le s < S \quad \text{Equation (2)}$$

A relative antenna position vector, $r_s^{BS}$, can be calculated as follows using Equation (3), where $\hat{r}_0^{BS}$ is a reference antenna:

$$r_s^{BS} = \hat{r}_s^{BS} - \hat{r}_0^{BS} = R \begin{bmatrix} \cos\left(\frac{2\pi s}{S}\right) - 1 \\ \sin\left(\frac{2\pi s}{S}\right) \end{bmatrix}, 0 \le s < S \quad \text{Equation (3)}$$

Assuming F channel subpath directions, a channel subpath unit vector, $k_l$, can be calculated as follows using Equation (4):

$$k_l = \frac{2\pi}{\lambda} \begin{bmatrix} \cos(\theta(l)) \\ \sin(\theta(l)) \end{bmatrix}, 0 \le l < L \quad \text{Equation (4)}$$

A relative phase difference of antenna s relative to the reference antenna can be calculated as follows using Equation (5):

$$\psi_{s,l} = \frac{2\pi}{\lambda} R \left( \cos(\theta(l))\left(\cos\left(\frac{2\pi s}{S}\right) - 1\right) + \sin(\theta(l))\sin\left(\frac{2\pi s}{S}\right) \right), \quad \text{Equation (5)}$$
$$0 \le l < L, 0 \le s < S$$

Equation (5) can be further simplified by assuming the circular radius, R, is equal to λ (e.g., for smaller circular array) and setting $$\theta(l) = \frac{2\pi l}{M}$$

for an equally separated channel angle. An l constant modulus rank 1 precoding matrix (e.g., code words), W, may be calculated as follows using Equation (6):

$$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \le l < L \quad \text{Equation (6)}$$

In some embodiments, Equation (6) can be used to calculate a beamforming vector or code word to facilitate beamforming between an eNB station (e.g., eNB station 40 or 42 of FIG. 1) and a UE (e.g., UE 15 of FIG. 1) for antennas configured in a circular configuration. For example, a code word may be a value of the precoding matrix W. l may be an index of the code word in the codebook. According to various embodiments, values for W are calculated and stored in a rank 1 structured codebook having a size of $\lceil \log_2(L) \rceil$ bits. In some embodiments, the codebook may be a 12 Tx codebook for twelve Tx antennas (e.g., S=12 in Equation (6)) of the eNB station. The codebook may be stored in one or both of the UE and the eNB station.

Equation (6) may be further simplified according to attributes of a uniform circular array. For example, if L of Equation (6) is a multiple of S such as in L=F·S, then Equation (6) can be rewritten as follows in Equation (7):

$$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \le l < F \cdot S \quad \text{Equation (7)}$$

Owing to the attribute that the circular array is symmetric, a number of unique code words to be designed may be only F code words. All remaining F(S−1) code words can be generated by cyclic shift of the F code words (e.g., to provide a set of orthogonal code words). For example, $W_{F+l}$ can be calculated as follows using Equation (8):

$$W_{F+l} = \frac{1}{\sqrt{S}} \begin{bmatrix} \exp(-\psi_{S-1,l}) \\ \exp(-\psi_{0,l}) \\ \ldots \\ \exp(-\psi_{S-2,l}) \end{bmatrix}, 0 \le l < F \quad \text{Equation 8)}$$

Further simplification of the codebook design for circular configurations can be made if S is an even number. For example, if a channel path travels through a pair of neighboring antennas for an angle, the channel path will travel through another pair of neighboring antennas for the same angle, but in a mirror position across the circular configuration. Such attribute may be used to further reduce a degree of freedom for codebook design.

A rank 1 codebook (e.g., a structured rank 1 codebook for 12 Tx UCA) can be designed for circular configurations by selecting a codebook size L (e.g., L=16), calculating a first group of L/2 code words using Equation (6) (e.g., $$\theta(l) = \frac{2\pi l}{8}, 0 \le l < 8 \Big),$$

and then calculating a second group of L/2 code words that are orthogonal to the first group of L/2 code words using Equation (5) and (6) (e.g., $$\theta(l+8) = \frac{2\pi l}{8} + 0.12\pi, 0 \le l < 8$$

or more generically $$\theta\left(l + \frac{L}{2}\right) = \frac{2\pi l}{L} + \text{delta}, 0 \le l < \frac{L}{2}\Big).$$

In this regard, L may correspond with a number of code words in the codebook. A rank 2 codebook (e.g., a structured rank 2 codebook for 12 Tx UCA) can be designed based on the rank 1 codebook described above. For example, a first column of the rank 2 codebook can use the $l^{th}$ code word from the rank 1 codebook and a second column of the rank 2 codebook can use the $(l+8)^{th}$ code word from the rank 1 codebook.

Figure 5:
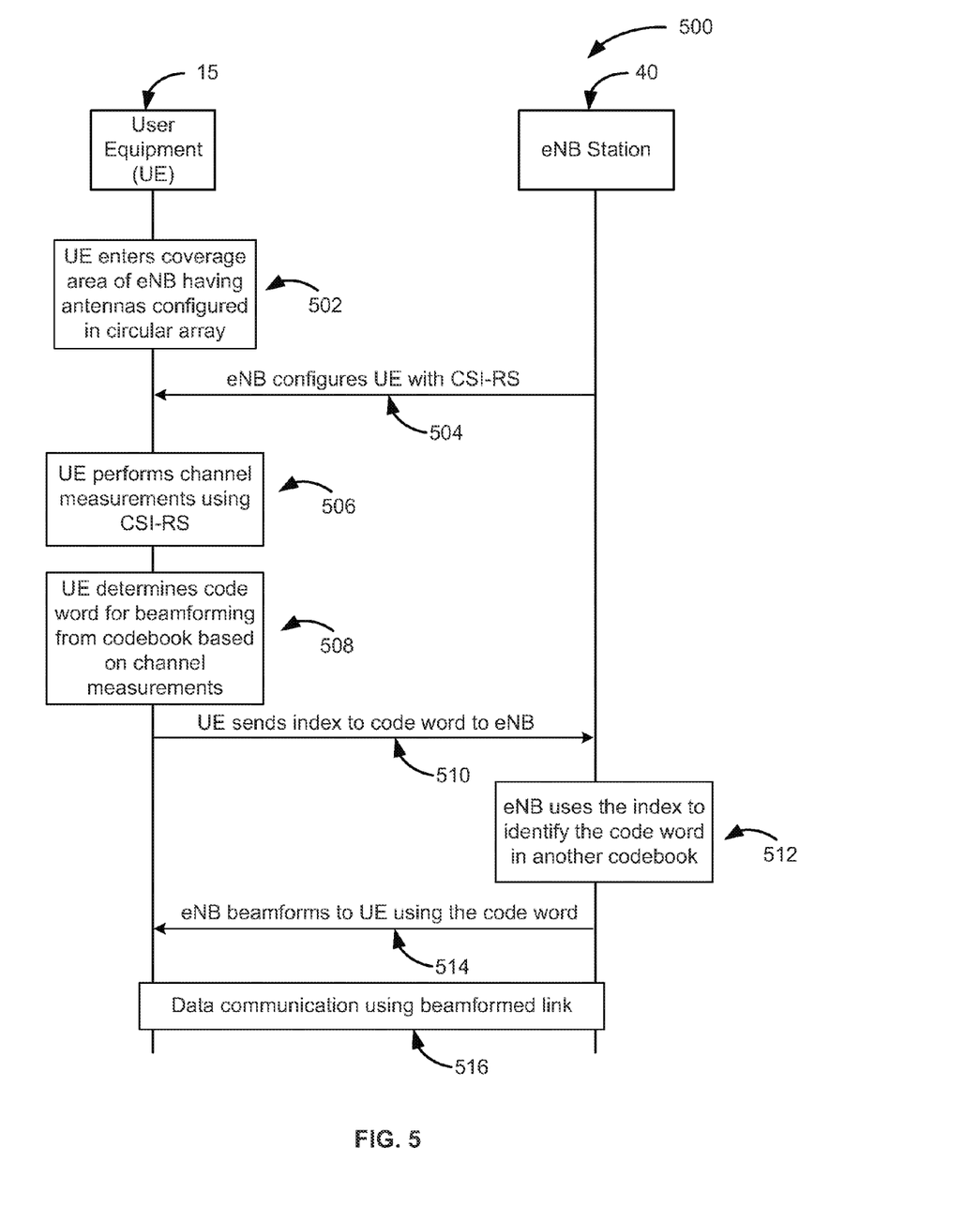
FIG. 5 schematically illustrates a link establishment scheme that implements a codebook designed for a circular array, in accordance with some embodiments.

FIG. 5 schematically illustrates a link establishment scheme 500 that implements a codebook designed for a circular array, in accordance with some embodiments. At 502, the UE 15 enters a coverage area of an eNB station (e.g., eNB station 40) having antennas configured in a circular array, e.g., a UCA. The eNB station 40 may detect that the UE enters the coverage area and, at 504, the eNB station 40 may configure (e.g., send) the UE 15 with a reference signal such as, for example, a Channel State Information Reference Signal (CSI-RS) for the UE 15 to use in performing channel measurements of the eNB station. For example, the CSI-RS may be a twelve antenna port CSI-RS pattern in some embodiments. The eNB station 40 may request the UE to feedback Channel Station Information (CSI) to enable the eNB station to communicate with the UE 15 using closed-loop MIMO communication.

At 506, the UE 15 may perform channel measurements using the received CSI-RS at 506. The UE 15 may perform channel measurements for each of multiple transmitting antennas of the eNB station 40 and for each receiving antenna of the UE 15. For example, in a case where a measured eNB has twelve Tx antennas and each Tx antenna is mapped to one CSI-RS port in the CSI-RS pattern and the UE has two receiver (Rx) antennas, the UE 15 may perform measurements and store information associated with each of the Tx antennas of the eNB station 40 and the Rx antennas of the UE 15 in a two-row/twelve-column channel matrix designated as H. The channel matrix H can have other sizes in other embodiments.

At 508, the UE 15 may determine a code word for beamforming from a codebook based on the performed channel measurements. The codebook may be designed for a circular antenna array (e.g., calculated using Equation (6)) and may be stored on a storage medium of the UE 15. For example, the UE 15 may select a code word based on one or more metrics (e.g., beamformed channel matrix capacity, etc.) or a predetermined criteria of the channel measurements. A code word may be selected that, for example, maximizes or minimizes a value that is calculated using the channel measurements or otherwise meets the predetermined criteria.

In some embodiments, a receiving signal, y, received at the UE 15 is represented by Equation (9), where H is the channel matrix, W is the precoding matrix (e.g., defined in Equation (6)), x is the transmitted signal, and n is a noise vector:

$$y = HWx + n \quad \text{Equation (9)}$$

In a case where the eNB station 40 has twelve Tx antennas, the UE 15 has two Rx antennas, and a signal transmission rank is one, y may have a matrix dimension of 2-by-1, H may have a matrix dimension of 2-by-12, W may have a matrix dimension of 12-by-1, x may have a matrix dimension of 1-by-1, and n may have a matrix dimension of 2-by-1. The UE 15 may use Equation (9) to determine a code word (e.g., a value of W).

The code word may be a value of the precoding matrix W defined by Equation (6) or variants thereof. That is, the precoding matrix W may constitute the codebook or may be part of the codebook. In some embodiments, the code word is a value used to facilitate beamforming between the eNB station 40 and the UE 15.

At 510, the UE 15 sends an index to the code word to the eNB station 40. The index may be a value that indicates the code word to the eNB station 40. For example, the eNB station 40 may use the index, at 512, to identify the code word in another codebook stored at the eNB station 40 (e.g., external to the UE 15 and/or local to the eNB station 40). In some embodiments, the codebook stored at the UE 15 and at the eNB station 40 have the same values stored therein. In other embodiments, the UE 15 may send the code word value to the eNB station 40.

At 514, the eNB station 40 may beamform to the UE 15 using the code word. In some embodiments, the UE 15 receives a signal y (e.g., as defined in Equation (9)) from the eNB station 40. The UE 15 and the eNB station may communicate using the beamformed link at 516.

Figure 6:
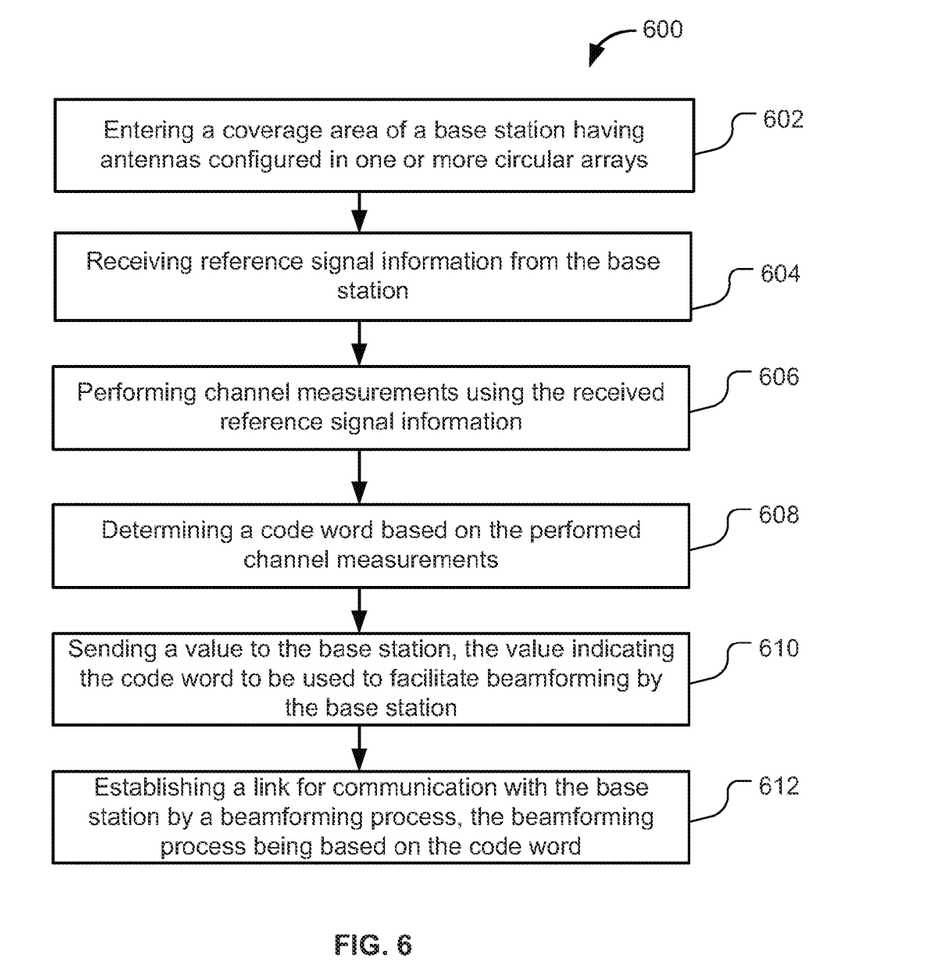
FIG. 6 is a flow diagram of a method for establishing a communication link in a wireless communication network, in accordance with some embodiments.

FIG. 6 is a flow diagram of a method 600 for establishing a communication link in a wireless communication network (e.g., BWA network 100 of FIG. 1), in accordance with some embodiments. According to various embodiments, the actions of method 600 are performed by a UE (e.g., UE 15 of FIG. 5) of the wireless communication network.

At 602, the method 600 includes entering a coverage area of a base station (e.g., eNB station 40 of FIG. 5) having antennas (e.g., antennas 202 or 302 of respective FIG. 2 or 3) configured in one or more circular arrays (e.g., circular array 205 or 305 of respective FIG. 2 or 3). The base station may detect that the UE has entered the coverage area and configure the UE with reference signal information.

At 604, the method 600 may further include receiving reference signal information from the base station. The reference signal information may include for example, a CSI-RS pattern for the antennas of the base station. The CSI-RS pattern may be received by the UE to perform channel measurements of the antennas of the base station. At 606, the method 600 may further include performing channel measurements using the received reference signal information. Based on the CSI-RS pattern, the UE may perform the channel measurements of the antennas of the base station.

At 608, the method 600 may further include determining a code word based on the performed channel measurements. The UE may determine a code word by selecting a code word from a codebook (e.g., calculated using Equation (6)) that maximizes or minimizes a metric or meets other predetermined criteria. For example, based on information acquired from performing the channel measurements, the UE may select a code word that maximizes a channel matrix capacity. In some embodiments, the metric is calculated by the UE using the channel measurements.

At 610, the method 600 may further include sending a value to the base station, the value indicating the code word to be used to facilitate beamforming by the base station. The value sent to the base station by the UE may include, for example, an index of the code word for the base station to identify the code word in a codebook stored at the base station.

At 612, the method 600 may further include establishing a link for communication with the base station by a beamforming process, the beamforming process being based on the code word. The UE and the base station may communicate using the established link.

Figure 7:
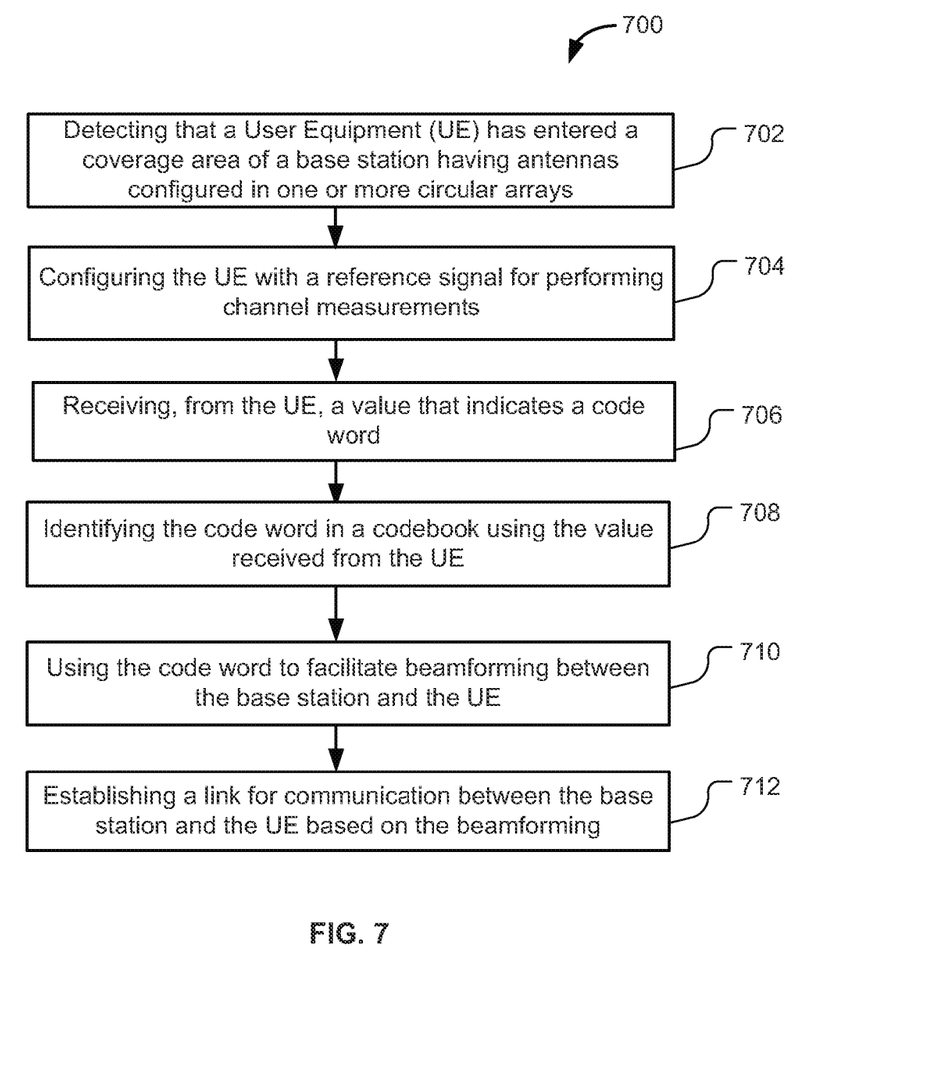
FIG. 7 is a flow diagram of another method for establishing a communication link in a wireless communication network, in accordance with some embodiments.

FIG. 7 is a flow diagram of another method 700 for establishing a communication link in a wireless communication network (e.g., BWA network 100 of FIG. 1), in accordance with some embodiments. According to various embodiments, the actions of method 700 are performed by a base station (e.g., eNB station 40 of FIG. 1) or corresponding control equipment of the wireless communication network.

At 702, the method 700 includes detecting that a User Equipment (e.g., UE 15 of FIG. 5) has entered a coverage area of a base station (e.g., eNB station 40 of FIG. 5) having antennas (e.g., antennas 202 or 302 of respective FIG. 2 or 3) configured in one or more circular arrays (e.g., circular array 205 or 305 of respective FIG. 2 or 3).

At 704, the method 700 may further include configuring the UE with a reference signal (e.g., CSI-RS) for performing channel measurements. The UE may be configured with a CSI-RS pattern for performing channel measurements of the antennas configured in one or more circular arrays. Using the CSI-RS pattern, the UE may perform the channel measurements and determine a code word based on the channel measurements. The UE may send a value to the base station to indicate the code word.

At 706, the method 700 may further include receiving, from the UE, the value that indicates the code word. The value may include an index in some embodiments. At 708, the method 700 may further include identifying the code word in a codebook using the value received from the UE. For example, the base station may receive an index that indicates a location of the code word in a codebook designed for circular arrays that is locally stored at the base station.

AT 710, the method 700 may further include using the code word to facilitate beamforming between the base station and the UE. The base station may beamform to the UE using code word.

At 712, the method 700 may further include establishing a link for communication between the base station and the UE based on the beamforming. The link may be used, for example, to wirelessly communicate information between the UE and the eNB station.

Figure 8:
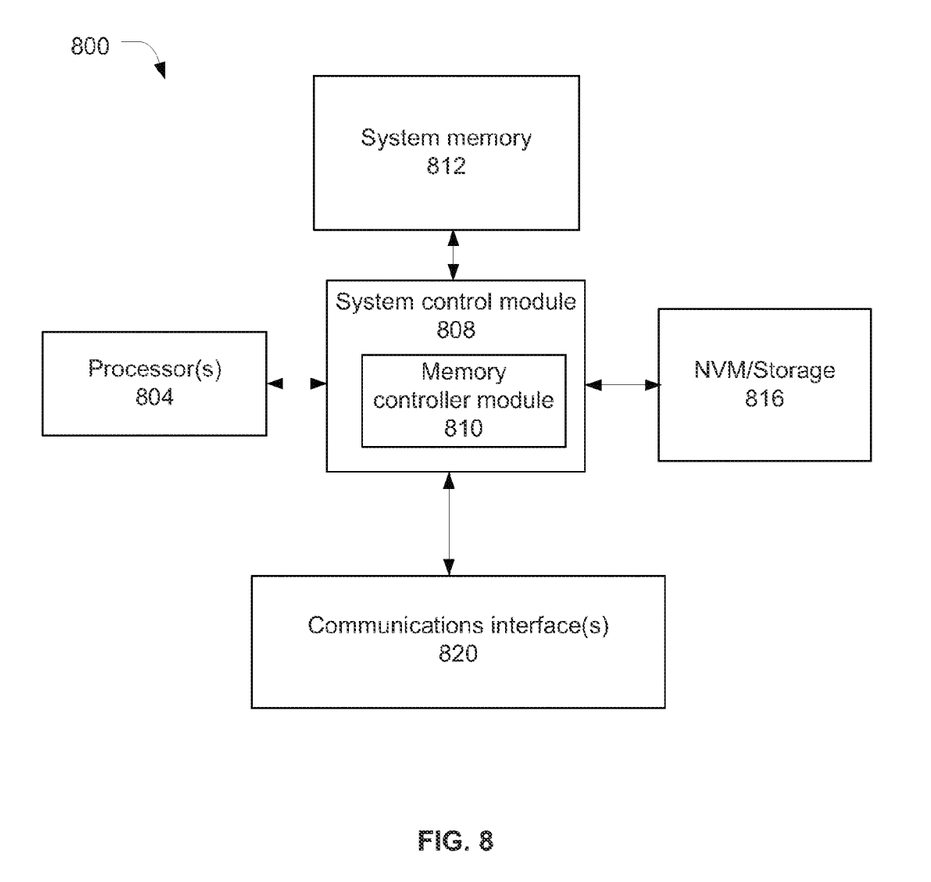
FIG. 8 schematically illustrates an example system that may be used to practice various embodiments described herein.

Embodiments of the present disclosure may be implemented into a system using any suitable hardware and/or software to configure as desired. FIG. 8 schematically illustrates an example system 800 that may be used to practice various embodiments described herein. FIG. 8 illustrates, for one embodiment, an example system 800 having one or more processor(s) 804, system control module 808 coupled to at least one of the processor(s) 804, system memory 812 coupled to system control module 808, non-volatile memory (NVM)/storage 816 coupled to system control module 808, and one or more communications interface(s) 820 coupled to system control module 808.

In some embodiments, the system 800 may be capable of functioning as the UE 15 as described herein. In other embodiments, the system 800 may be capable of functioning as the one or more servers 50 of FIG. 1 or otherwise provide logic/module that performs functions as described for a base station (e.g., eNB station 40 of FIG. 1) herein.

System control module 808 for one embodiment may include any suitable interface controllers to provide for any suitable interface to at least one of the processor(s) 804 and/or to any suitable device or component in communication with system control module 808.

System control module 808 may include memory controller module 810 to provide an interface to system memory 812. The memory controller module 810 may be a hardware module, a software module, and/or a firmware module.

System memory 812 may be used to load and store data and/or instructions, for example, for system 800. System memory 812 for one embodiment may include any suitable volatile memory, such as suitable DRAM, for example. In some embodiments, the system memory 812 may include double data rate type four synchronous dynamic random-access memory (DDR4 SDRAM).

System control module 808 for one embodiment may include one or more input/output (I/O) controller(s) to provide an interface to NVM/storage 816 and communications interface(s) 820.

The NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

Communications interface(s) 820 may provide an interface for system 800 to communicate over one or more network(s) and/or with any other suitable device. The system 800 may wirelessly communicate with the one or more components of the wireless network in accordance with any of one or more wireless network standards and/or protocols.

For one embodiment, at least one of the processor(s) 804 may be packaged together with logic for one or more controller(s) of system control module 808, e.g., memory controller module 810. For one embodiment, at least one of the processor(s) 804 may be packaged together with logic for one or more controllers of system control module 808 to form a System in Package (SiP). For one embodiment, at least one of the processor(s) 804 may be integrated on the same die with logic for one or more controller(s) of system control module 808. For one embodiment, at least one of the processor(s) 804 may be integrated on the same die with logic for one or more controller(s) of system control module 808 to form a System on Chip (SoC).

In various embodiments, the system 800 may be, but is not limited to, a server, a workstation, a desktop computing device, or a mobile computing device (e.g., a laptop computing device, a handheld computing device, a tablet, a netbook, etc.). In various embodiments, the system 800 may have more or less components, and/or different architectures. For example, in some embodiments, the system 800 includes one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
   receiving, by user equipment, UE, from an enhanced node B, eNB, station of a wireless communication network, a Channel State Information Reference Signal, CSI-RS, for the UE to perform channel measurements of multiple antennas of the eNB station, wherein the multiple antennas are configured in one or more circular arrays;
   performing, by the UE, channel measurements of the multiple antennas of the eNB station using the received CSI-RS;
   determining, by the UE, a code word based on the channel measurements, the code word being stored in a first codebook stored at the HE and designed for a circular antenna array;
   sending, by the UE to the eNB station, a value that is an index of the code word for the eNB station to identify the code word in a second codebook stored at the eNB station.

2. A method comprising:
   receiving, by user equipment, UE, from an enhanced node B, eNB, station of a wireless communication network, a Channel State Information Reference Signal, for the UE to perform channel measurements of multiple antennas of the eNB station, wherein the multiple antennas are configured in one or more circular arrays;
   performing, by the UE, channel measurements of the multiple antennas of the eNB station using the received CSI-RS; and
   determining, by the UE, a code word, W, based on the channel measurements, W being stored in a codebook designed for a circular antenna array,
   wherein W is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook.

3. An apparatus comprising:
   an antenna;
   a processor to communicate with an enhanced node B, eNB, station of wireless communication network via the antenna; and
   a storage medium coupled to the processor, the storage medium having instructions stored thereon, that if executed by the processor, result in:
   receiving, from the eNB station, a Channel State Information Reference Signal, CSI-RS, for the apparatus to perform channel measurements of twelve antennas of the eNB station, wherein the twelve antennas are configured in one or more circular arrays;
   determining a code word, W, based on channel measurements performed by the apparatus using the CSI-RS, W being stored in a codebook designed for a circular antenna array, wherein W is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, S corresponds to a number of antennas of the eNB station, $\psi$ is a relative phase difference between antennas of the eNB station, and L corresponds to a number of code words in the codebook; and
   sending, to the eNB station, a value that indicates W, W to facilitate beamforming between the eNB station and the apparatus.

4. A method comprising:
   configuring, by a base station of a wireless communication network, a user equipment, UE, with a Channel State Information Reference Signal, CSI-RS, for performing channel measurements of twelve antennas of the base station, wherein the twelve antennas are configured in one or more circular arrays;
   receiving, by the base station from the UE, a value that indicates a code word W of a codebook designed for a circular antenna array, W being used by the base station to facilitate beamforming between the base station and the UE, W being based on the channel measurements performed by the UE using the configured CSI-RS, wherein W is a value defined by the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \leq l < L,$$

where l is an index of the code word in the codebook, s corresponds to a number of antennas of the eNB station, $\psi$ is a relative phase difference between antennas of the eNB station, and L corresponds to a number of code words in the codebook.

5. A method comprising:
   configuring, by a base station of a wireless communication network, a user equipment, UE, with a Channel State Information Reference Signal, CSI-RS, for performing channel measurements of twelve antennas of the base station, wherein the twelve antennas are configured in one or more circular arrays;
   receiving, by the base station from the UE, a value that indicates a code word of a codebook designed for a circular antenna array, the code word being used by the base station to facilitate beamforming between the base station and the UE, the code word being based on the channel measurements performed by the UE using the configured CSI-RS; and wherein the codebook for the circular antenna array is designed at least in part by:

selecting a codebook size, L;

calculating L/2 number of code words of a first group using the following equation $$W_l = \frac{1}{\sqrt{S}} \begin{bmatrix} \exp(-\psi_{0,l}) \\ \exp(-\psi_{1,l}) \\ \ldots \\ \exp(-\psi_{S-1,l}) \end{bmatrix}, 0 \le l < \frac{L}{2}$$

and calculating L/2 number of code words of a second group, the code words of the second group being orthogonal to the first group of code words.

* * * * *